United States Patent [19]

Mathus et al.

[11] Patent Number: 4,690,757
[45] Date of Patent: Sep. 1, 1987

[54] SMALL VOLUME LABORATORY FILTER

[75] Inventors: Gregory Mathus, Concord, Mass.; George Lyman, Cape Porpoise, Me.; Kevin Looney, Bedford, Mass.

[73] Assignee: Costar Corporation, Cambridge, Mass.

[21] Appl. No.: 842,494

[22] Filed: Mar. 21, 1986

[51] Int. Cl.⁴ ............................................. B01D 13/00
[52] U.S. Cl. ................................ 210/232; 210/433.2; 210/446; 210/456
[58] Field of Search ...................... 210/232, 433.2, 447, 210/456, 927, 446

[56] References Cited

U.S. PATENT DOCUMENTS

| | | | |
|---|---|---|---|
| 3,578,172 | 5/1971 | Sirotkina et al. | 210/456 |
| 4,229,306 | 10/1980 | Hein et al. | 210/927 |
| 4,321,139 | 3/1982 | Auclair | 210/232 |
| 4,390,425 | 6/1983 | Tafara et al. | 210/232 |
| 4,422,939 | 12/1983 | Sharp et al. | 210/447 |
| 4,444,661 | 4/1984 | Jackson et al. | 210/447 |
| 4,485,014 | 11/1984 | Gilroy et al. | 210/456 |

Primary Examiner—Richard V. Fisher
Assistant Examiner—Jeffrey W. Peterson
Attorney, Agent, or Firm—Wolf, Greenfield & Sacks

[57] ABSTRACT

A small volume laboratory filter having a thin rectangular body and coaxial inlet and outlet sleeves connected to opposite ends thereof. A very thin filter cavity is formed in the body and lies in a plane inclined slightly to the common axis of the inlet and outlet sleeves. The cavity is divided by a filter membrane into extremely thin chambers, one communicating with the inlet sleeve and the other with the outlet sleeve. A rigid package for the filter is sealed across one end by a flexible cover which when stripped from the package exposes the inlet sleeve so that it may be readily engaged by a syringe nipple or other fluid source without the user having to touch the filter. When the inlet sleeve is engaged, the filter may be withdrawn from the package.

16 Claims, 10 Drawing Figures

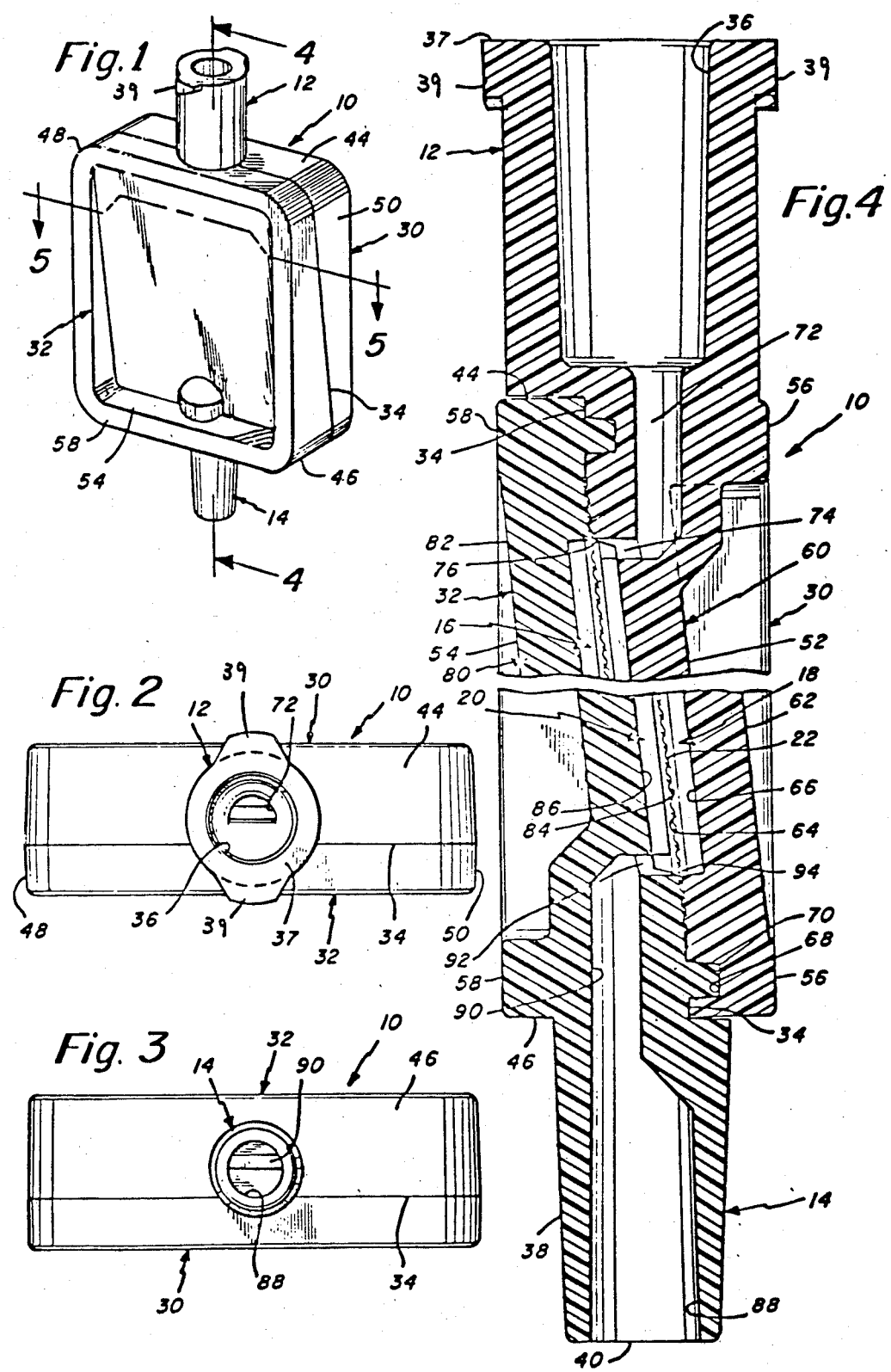

SMALL VOLUME LABORATORY FILTER

INTRODUCTION

This invention relates to small volume filters and more particularly comprises a new and improved laboratory filter suitable for such applications as sterilization or clarification of aqueous fluids, aseptic dispensing of small fluid volumes, filtration of gaseous and liquid fluids, etc. In addition, the invention relates to the packaging of the small volume filter.

One important object of the present invention is to provide a small volume filter which when used with a syringe does not visually obstruct the discharge sleeve of the filter so that the user can readily manipulate the syringe and direct the discharge in a precise direction. For example, when the syringe is used with the filter of this invention to dispense small quantities of filtered fluid into the wells of a multiwell culture plate, the body of the filter mounted on the end of the syringe should not visually obstruct the discharge end of the syringe-filter assembly so that the operator may accurately deposit the filtered fluid.

Another important object of the present invention is to provide a small volume filter which is free of dead end spaces that may trap a volume of the fluid being filtered. Frequently, the fluids being processed are extremely expensive and the loss of even a small quantity of such fluid may represent a substantial financial loss.

Yet another important object of the present invention is to provide a small volume filter which is capable of withstanding high pressures. Frequently, small laboratory filters are called upon to withstand pressures in the range of 150 psig, and most filters now available are incapable of doing so.

Another important object of the present invention is to provide a small volume filter which is capable of filtering the output of a syringe or the input to a syringe as desired by the user.

Another important object of this invention is to provide a filter which will not air lock and which may be primed in any position.

Still another important object of the present invention is to provide a small volume filter with packaging which maintains a sterile atmosphere for the filter and which when opened enables the filter to be mounted on the nipple of syringe without the need for the user to physically contact the filter, so as to avoid contamination.

Another important object of the present invention is to provide a combination filter and filter package assembly which can be held and manipulated easily and which will not twist in the hand when a torque is applied to the filter as a syringe is being mounted on it.

Yet another important object of the present invention is provide a filter and filter package combination which is self-supporting, will stand upright on flat support, and which may be efficiently stored in large numbers in a relatively small volume.

Another important object of this invention is to provide a package or container for small volume filters, which can serve as a tool for the removal and disposal of the filter after use. This is particularly desirable when the filter is used for dangerous compounds.

To accomplish the foregoing and other objects, the filter of the present invention is embodied in a relatively flat rectangular body. Coaxial inlet and outlet sleeves are connected to opposite ends of the body and communicate with the opposite ends of a flat filter cavity within the body. The filter cavity lies in a plane which defines an acute angle with the axis of the sleeves. A filter membrane supported in the cavity divides it into an inlet and outlet chamber which respectively communicate with the inlet and outlet sleeves. Manifolds perpendicular to the sleeves spread the liquid entering the chamber from the inlet sleeve across one end of the inlet chamber and collect the filtered fluid at the opposite end of the cavity in the outlet chamber. Grooves are provided in the surfaces of the inlet and outlet chambers to respectively spread the entering fluid over the upstream face of the filter membrane and collect the filtered fluid from the downstream face thereof.

The package which contains the filter is a small relatively flat rectangular container which in the preferred form carries a peel away cover at its open end. The cover overlaps the edges of the container so that it may easily grasped by the thumb and forefinger and peeled off it. Supports are provided within the container to orient the filter so that its outlet sleeve does not contact the interior wall of the chamber and so that the inlet sleeve may be engaged by the nipple of a syringe without the necessity of the user touching the filter.

These and other objects and features of this invention will be better understood and appreciated from the following detailed description of one embodiment thereof read in connection with the accompanying drawings.

BRIEF FIGURE DESCRIPTION

FIG. 1 is an enlarged perspective view of a small volume filter constructed in accordance with this invention;

FIGS. 2 and 3 are enlarged views of the inlet and outlet ends of the filter;

FIG. 4 is an enlarged fragmentary cross-sectional view of the filter taken along section line 4—4 in FIG. 1;

Figure 8:
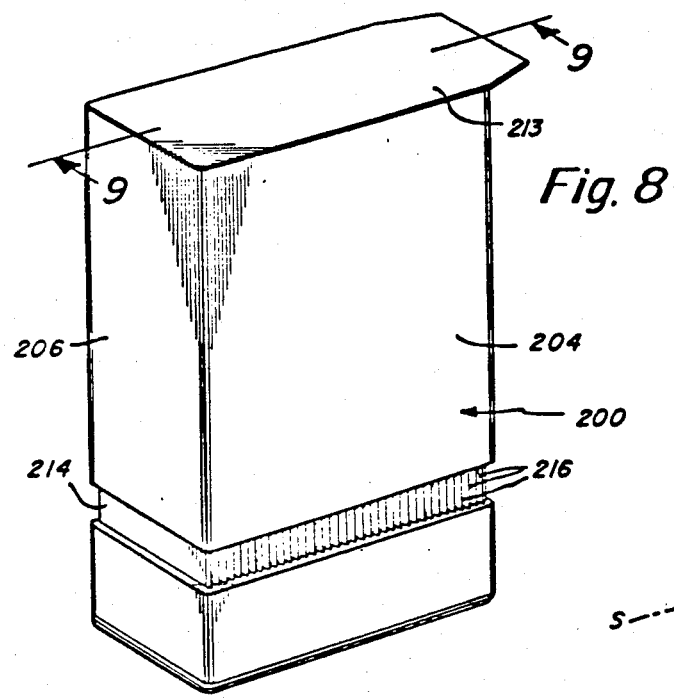
FIG. 8 is a perspective view of the package in which the filter is distributed.
Figure 9:
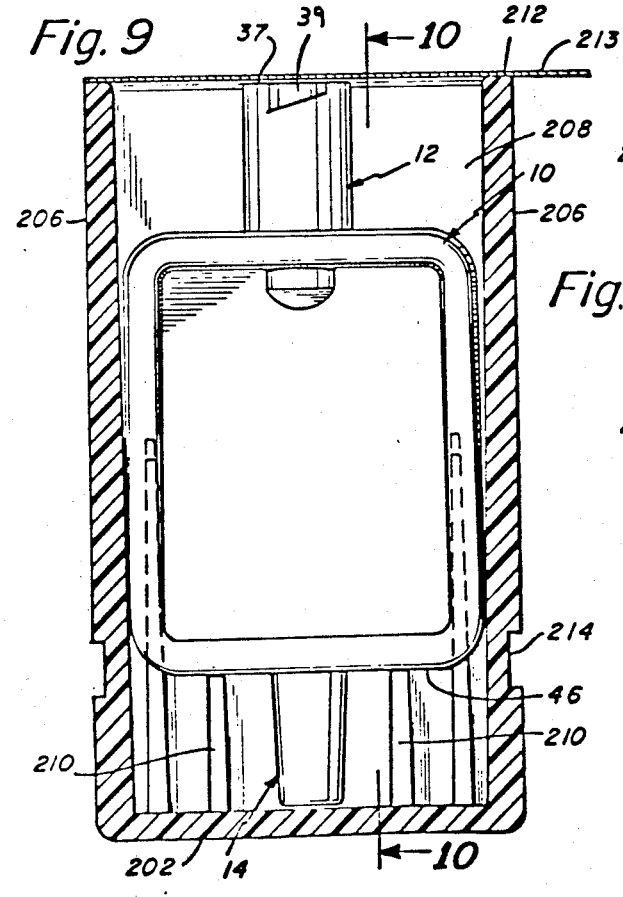
Figure 10:
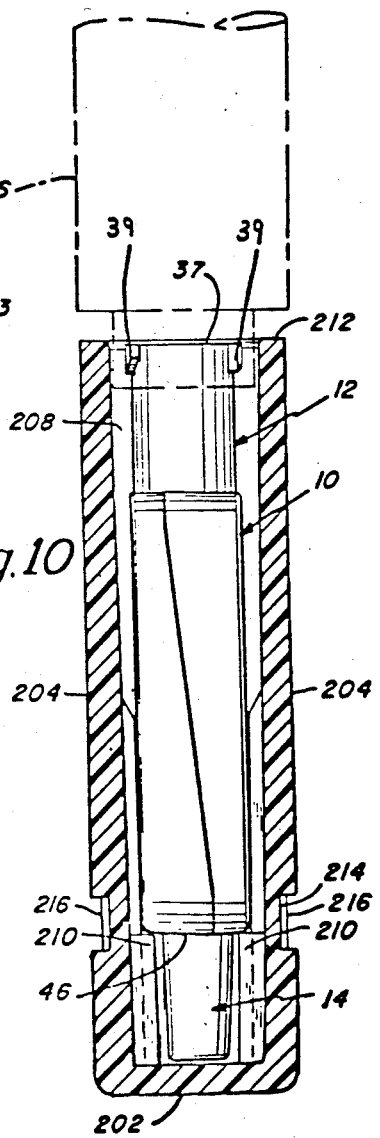

FIG. 9 is a cross-sectional view of the package taken along the section line 9—9 in FIG. 8 and showing the filter within it; and FIG. 10 is a cross-sectional view of the filter package taken along section line 10—10 in FIG. 9, with the foil cover of the package removed and showing how the filter is supported inside, and further suggesting how access to the filter inlet sleeve is provided so that the filter may be removed without touching it.

DETAILED DESCRIPTION

The small volume laboratory filter shown in the drawing includes a body 10, inlet sleeve 12 and outlet sleeve 14. The body contains a filter cavity 16 which in turn is subdivided into two chambers 18 and 20 by the filter membrane 22. The inlet 12 and outlet 14 are respectively connected to the chambers 18 and 20. The several parts of the filter identified briefly above are described in detail below.

The filter 10 is made up of three separate components, namely, plates 30 and 32 which respectively carry and include the inlet sleeves 12 and 14, and the filter membrane 22. The two plates when assembled sandwich the filter membrane 22 and are ultrasonically welded together along the parting line 34 which is visible in FIGS. 1–3. The two plates 30 and 32 are very similar to one another although they differ slightly in detail. For example, the respective sizes of the inlet and outlet sleeves are different.

The inlet sleeve 12 is of standard internal dimensions and includes a luer lock defined by the taper of its interior passage 36 as shown in FIG. 4. The passage 36 is conventionally shaped to receive the discharge nipple of a syringe. The sleeve 12 also carries a bayonet-type thread 39 on its outer surface to engage the locking collar on the syringe which pulls the nipple of the syringe into the sleeve. The collar of the syringe S is suggested in FIG. 10 The outlet sleeve 14 connected to and forming part of the plate 32 has an exterior surface 38 which is tapered toward the free end 40 so that it may engage the inlet of a needle or be inserted into a tube or other similar device. As is evident in FIGS. 1–14 the inlet and outlet sleeves 12 and 14 are coaxial and their common axis is coincident with the central plane of the body 10. As described more fully below, this feature facilitates use of the filter.

The plates 30 and 32 may be molded of such materials as polyvinylchloride or polycarbonate and may be transparent or opaque. The filter membrane 22 may have a pore size of from 0.05 to 10.0 microns and may be made of such materials as cellulose acetate, cellulose nitrate, nylon, teflon, etc.

The assembled filter body 10 includes ends 44 and 46, sides 48 and 50 and opposite faces 52 and 54. The faces 52 and 54 are respectively formed on the plates 30 and 32, and the respective faces include rims 56 and 58 that lie in planes parallel to one another and to the axis of the inlet and outlet sleeves 12 and 14.

Figure 5:
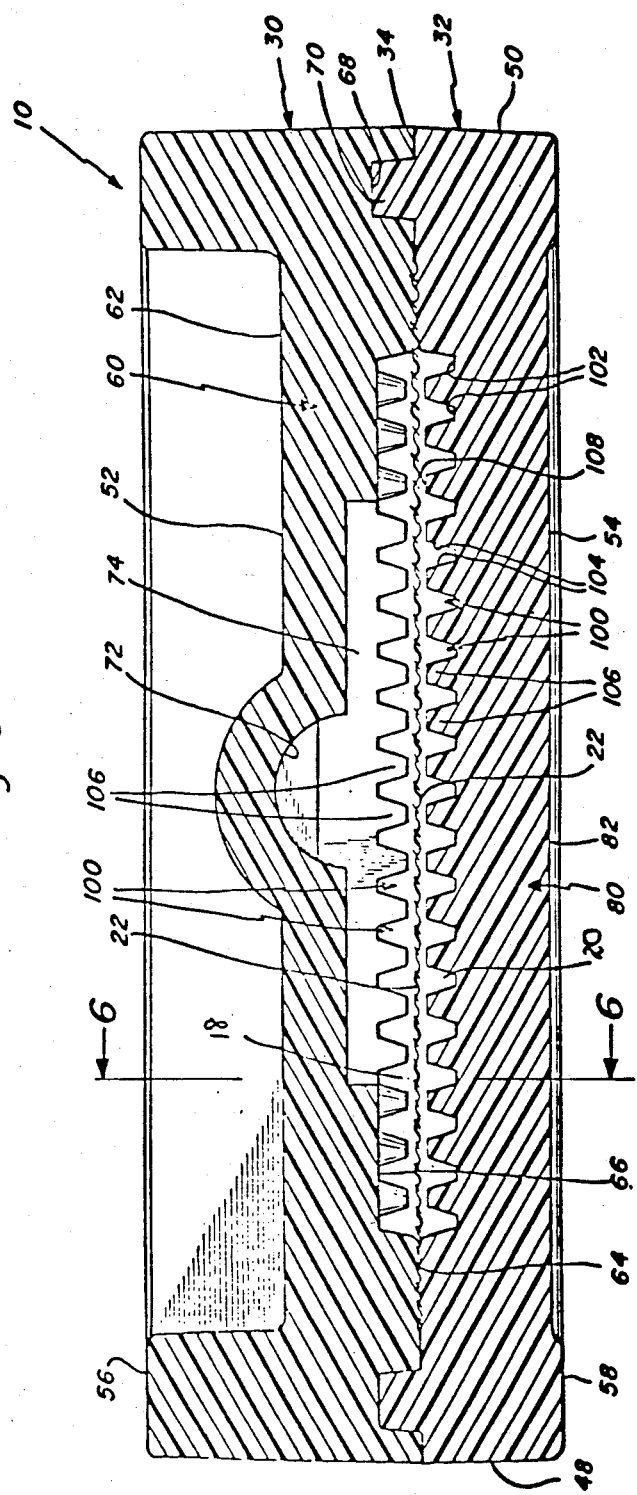
FIG. 5 is an enlarged cross-sectional view of the filter taken along section line 5—5 in FIG. 1.
Figure 6:
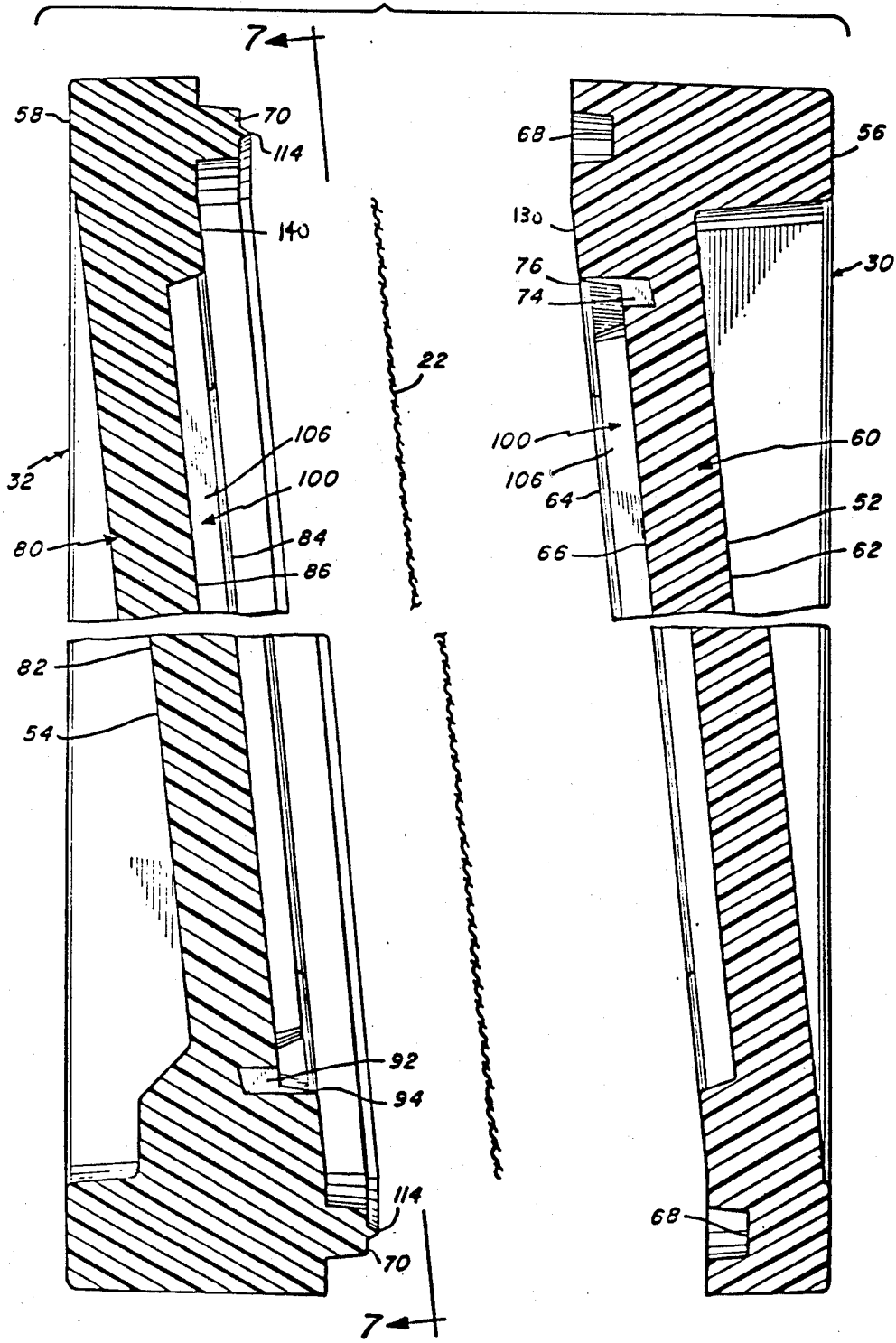
FIG. 6 is an enlarged exploded cross-sectional view of the filter taken along section line 6—6 in FIG. 5.

The plate 30 has a central panel 60 which is inclined with respect to the axis of the inlet sleeve 12 as is clearly shown in FIGS. 4 and 6. One surface 62 of the panel 60 in part defines the face 52 of the body when the plates are assembled, and the opposite surface 64 of the panel 60 contains a very shallow recess 66 throughout substantially its full extent, that defines the inlet chamber 18 of cavity 16. The shallow recess 66 is surrounded by a groove 68 about all four sides thereof, which receives the tongue 70 on the plate 32 as described more fully below. As shown in FIG. 4, the tapered passage 36 in the inlet sleeve 12 communicates with the recess 66 in panel 60 through a port 72 and manifold 74. The manifold 74 extends across substantially the full width of the recess 66 and is oriented perpendicular to the port 72 adjacent the end 76 of the recess as shown in FIG. 5. The configuration of the manifold will be more apparent from the description of the outlet manifold 92 in the plate 32 which follows. The port 72 as shown in FIG. 2 is semicircular in cross-section and lies a substantial distance from the plane of surface 64 of the panel at the adjacent end.

Figure 7:
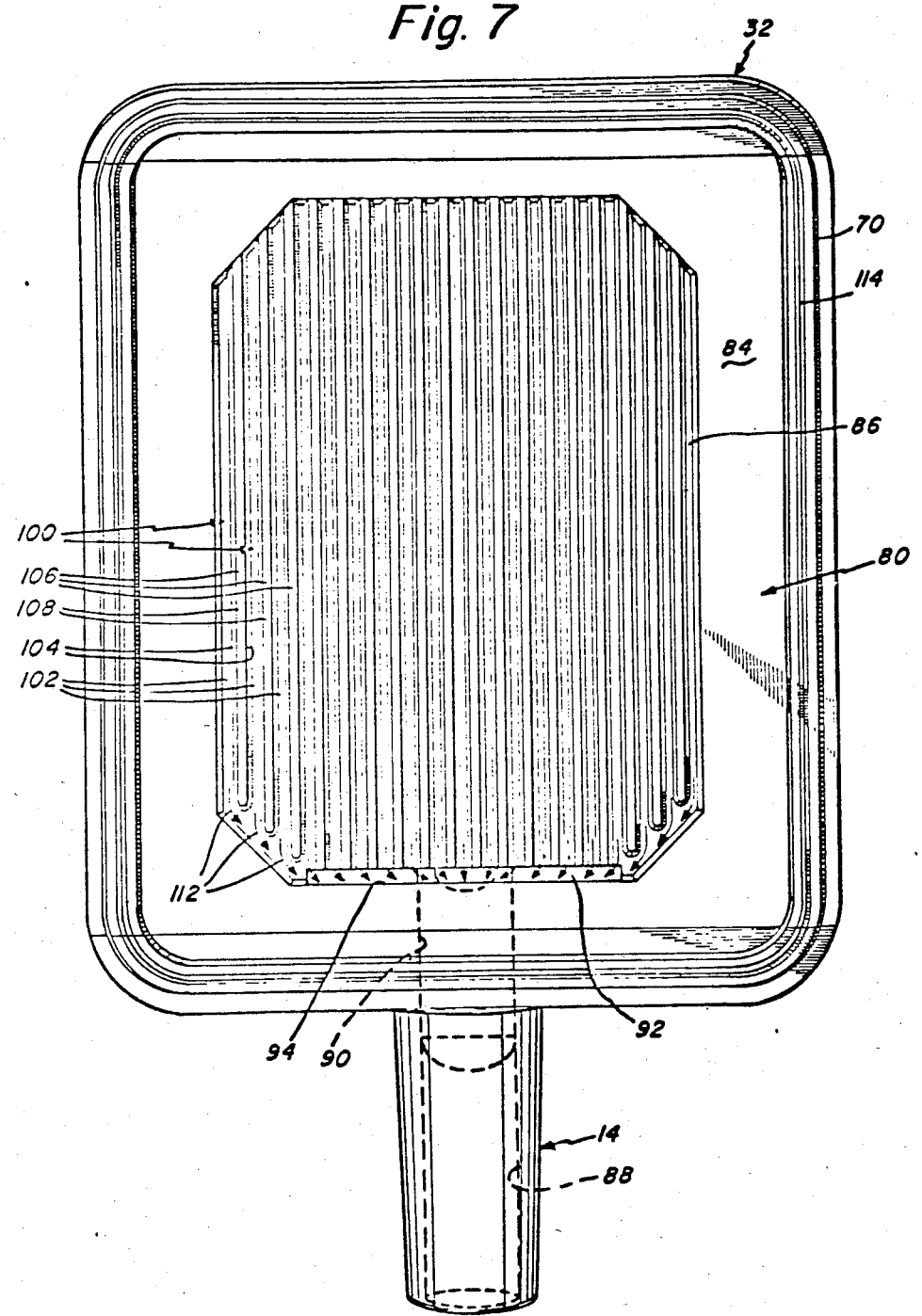
FIG. 7 is an enlarged plan view of the inner face of one plate of the filter viewed along sight line 7—7 in FIG. 6.

The plate 32 as shown in FIGS. 4 and 6 includes panel 80 very similar to the panel 60 of plate 30. Outside surface 82 of panel 80 which in part defines the face 54 of the assembled body has a surrounding rim 58. A recess 86 in the opposite surface 84 of panel 80 and which serves as the outlet chamber 20 is surrounded by the tongue 70 that mates with the groove 68 in the surface 64 of panel 60 in the other plate 30. As shown in FIGS. 4, 6 and 7, recess 86 is connected to the passage 88 in the outlet sleeve 14 by a port 90 and manifold 92 much like the port 72 and manifold 74 in the other plate. The manifold 92 extends across substantially the full width of the recess 86 adjacent end 94, and port 90 is displaced a substantial distance from the plane of surface 84 at its adjacent end.

In FIGS. 5 and 6, the interior surfaces of recesses 66 and 86 are shown covered with an array of channels that serve to distribute fluid flow on the one hand from inlet manifold 94 throughout the inlet chamber 18 of the cavity 16 and the side of the membrane 22 which in part defines it, and on the other hand, from the outlet chamber 20 of the cavity and the other side of the filter membrane 22 to the manifold 92. The channel arrays on the surfaces 66 and 86 are mirror images of one another, and therefore the illustration of the face of the channels in surface 86 as shown in FIG. 7 is equally illustrative of the channel array in the face 66.

In FIGS. 5 and 7, the channel array is shown made up of a series of grooves 100 having flat bottom walls 102 and diverging side walls 104. The side walls 104 are formed in ribs 106 having flat top surfaces 108 that support the filter membrane 22 when the body is assembled. Fluid entering the inlet chamber 18 from manifold 74 will quickly flow into those channels 100 which directly communicate with the manifold outletadjacent end 76 of recess 66 and spread in the chamber 18 over the face of the filter membrane 22. The filtered fluid after passing through the filter membrane will then enter the channels 100 in the outlet chamber 20 and proceed to the manifold 92 as suggested by the arrows 112 in FIG. 7.

The two plates 30 and 32 are assembled by positioning the tongue 70 of plate 32 in the groove 68 of plate 30 and ultrasonically welding the plates together. As shown in FIGS. 6 and 7, welding beads 114 are formed in the end surfaces of the tongue 70 for that purpose. The membrane 22 is clamped in place between the surfaces 130 and 140 which respectively surround the recesses 66 and 86 and lie within the groove 68 and tongue 70. While the flat tops 108 of the ribs 106 are shown spaced from the filter membrane 22 in FIGS. 4 and 5, the tops engage and support the filter membrane when the filter is assembled.

In accordance with one embodiment of this invention, the body 10 of the filter is approximately 1"×0.75×0.315" and the overall length of the filter measured from extreme ends of the inlet and outlet sleeves is 1.75".

The filter of this invention has many advantages. First, when mounted on the nipple of a syringe, the body portion 10 of the filter does not visually obstruct the discharge sleeve 14 and therefore, the user can readily manipulate the syringe carrying the filter so as to point the discharge sleeve 14 or the needle or tube carried by it into any small space such as the well of a multiwell plate. Furthermore, in normal use the body 10 is oriented in a vertical plane and the normal flow through the filter is from top to bottom. Consequently, no traps exist between the inlet and outlet manifolds where the fluid being filtered can collect and be lost. This is particularly important because frequently the fluid being processed is very expensive and the loss of even a small quantity of the fluid represents a substantial loss in dollars.

The symmetrical internal flow channels and patterns of the filter provide an additional advantages, namely, they allow the filter unit to be used to filter either the output of a syringe or the input to it. It is evident that the flow path through the unit may be in either direction and it will perform in exactly the same fashion.

It will also be appreciated that the dispersal pattern and manifold at the end of the channels prevents the unit from air locking and allows it to be primed without regard to its orientation without entrapping air. This advantage is derived from the filter with flow through it in either the forward or reverse direction.

Another advantage of the present invention is that even though the orientation of the parting line between the two plates is at an acute angle to the center of the assembled filter, the welding of the tongue and groove may be carried out in a vertical orientation.

Yet another advantage of the present invention is provided by the heavy rim which is provided about the body. Small volume filters normally are subjected to substantial pressures, frequently in the range of 150 psi, and the heavy rim about the body is quite capable of withstanding such pressures.

The configuration of the filter lends itself to advantageous packaging of the product. In its package, the filter can be handled easily and very conveniently and can be mounted on the discharge nipple of a syringe without touching the filter.

In FIGS. 8-10, a package for the filter constructed in accordance with this invention is shown. The package which may be molded of styrene or other inexpensive material includes a generally rectangular container 200 having a bottom wall 202, parallel side walls 204 and parallel end walls 206. The container walls define a chamber 208 sized to receive the assembled filter with its outlet sleeve 14 spaced from the bottom wall 202 between ribs 210 which engage the end wall 46 of the body (see FIGS. 9 and 10). The width and breadth of the chamber 208 just exceeds the width and thickness of the body 10 so that it fits freely into the chamber but with little freedom to move about in it. When the body is supported on the ribs 210 in the manner shown in FIG. 10, the end 37 of the inlet sleeve 12 lies below the top edge 212 of the package. The top edge 212 of the package is flat so that it may receive a peelable cover 213 which may be sealed in place on it. Access to the inlet sleeve 12 of the filter in the package is obtained merely by stripping the cover 213 away.

In FIG. 8 a groove 214 is shown formed in the walls 204 and 206 so as to extend about the entire package in a horizontal plane spaced upwardly from the bottom wall 202. Preferably, the inner surface is serrated along the side walls 204. The serrations 216 are designed to engage a stand or bracket (not shown) for supporting or holding a number of packages 200 for dispensing them one at a time to the user.

Whether or not, the package is held manually or in some form of stand or other support, it will be appreciated that when the cover 213 is stripped away, the nipple of the syringe may readily be inserted into the inlet sleeve 12, and a collar on the nipple may lock onto the bayonet threads 39 as suggested in FIG. 10. The flat configuration of the package makes it easy to handle, and it will not twist or slip within the fingers as the collar is rotated. Moreover, when the package is squeezed in the fingers as the filter is being mounted on a syringe or other implement, there will be no tendency for the filter to be ejected from the package.

The rigid package has still other advantages. The flat bottom 202 enables the package to stand on a table or other surface, and it will not roll away. Because the filter is normally packaged as a sterile object in the container, the ease of engaging the inlet sleeve avoids any tendency for the operator to physically handle the filter body, which could adversely affect its sterile condition. Furthermore, the rectangular configuration of the filter and its package maximizes storage capacity within a given volume.

Having described this invention in detail. Those skilled in the arts will appreciate that numerous modifications may be made therein without departing from the spirit of this invention. For example, while the inlet and outlet sleeves 12 and 14 have tapered inner and outer surfaces respectively to form luer locks, bayonet nipples such as shown at 39 may be provided at both ends to facilitate filtering a solution directly from one syringe to another. Therefore, it is not intended that the scope of this invention be limited to the specific embodiment illustrated and described. Rather, it is intended that the scope of this invention be determined by the appended claims and their equivalents.

We claim:

1. A small volume laboratory filter comprising
    a thin rectangular body having opposed ends and connecting sides and opposite generally parallel faces,
    means defining a shallow filter cavity extending over a major portion of the body's rectangular dimensions and having opposite side walls,
    said cavity being inclined with one end lying closely adjacent one face of the rectangular body along one end thereof and the opposite end of the cavity lying closely adjacent the other face of the body along the opposite end thereof,
    an inlet sleeve connected to one end of the body and an outlet sleeve coaxial therewith connected to the other end thereof,
    separate inlet and outlet manifolds connecting each sleeve to the cavity adjacent the respective ends, the respective connections to the cavity being through the opposite side walls,
    and a filter membrane bisecting the cavity and disposed parallel to the cavity side walls so that the manifold connections to the cavity from the inlet and outlet sleeves are disposed on opposite sides of the membrane.

2. A small volume filter as defined in claim 1 further characterized by
    shallow channels provided in the cavity side walls for expediting the flow of fluid to be filtered from the inlet manifold over one face of the filter membrane and from the other face of the filter membrane to the outlet manifold.

3. A small volume filter as defined in claim 1 further characterized by
    said manifolds being generally perpendicular to the common axis of the sleeves.

4. A small volume filter as defined in claim 1 further characterized by
    said body being made of two wedge-shaped plates each having the same plan dimensions as the assembled body and each including one of the faces of the body,
    the inlet sleeve being connected to the thicker end of one of the plates and the outlet sleeve being connected to the thicker end of the other of said plates, a shallow recess in the side of each plate opposite its face, said recesses each including one side wall of the cavity and together defining the cavity when the plates are assembled to form the body, said recesses being inclined with respect to the faces of the plates, and a tongue about the recess in one of the plates and a groove about the recess in the other of the plates, said tongue and groove interfitting with one another when the plates are assembled.

5. A small volume filter comprising a body having inlet and outlet ends and a pair of plates secured to each other in face to face relationship, walls defining shallow recesses in the opposed faces of the plates together defining a thin cavity between the plates, an inlet sleeve connected to one of the plates and the inlet end of the body and an outlet sleeve connected to the other of the plates and the outlet end of the body, said inlet and outlet sleeves having a common axis a filter membrane disposed between the plates in the cavity and generally parallel to the walls defining the recesses and dividing the cavity into inlet and outlet chambers on opposite sides of the filter membrane, the axes of said inlet and outlet sleeves forming an acute angle with the plane of the membrane, the axes of said inlet and outlet sleeves forming an acute angle with the plane of the membrane, and a manifold adjacent each of the inlet and outlet ends connecting the inlet sleeve to the inlet chamber and the outlet sleeve to the outlet chamber.

6. A small volume filter as defined in claim 5 further characterized by channels disposed in each of the recesses for assisting the flow of fluid to be filtered over the face of the filter membrane in the inlet chamber and from the face of the filter membrane in the outlet chamber.

7. A small volume filter as defined in claim 5 further characterized by said inlet manifold being in the plate to which the inlet sleeve is connected, said manifold lying adjacent the inlet end of the body and perpendicular to the axis of the inlet sleeve.

8. A small volume filter as defined in claim 7 further characterized by said outlet manifold being in the plate to which the outlet sleeve is connected, said manifold lying adjacent the outlet end of the body and perpendicular to the axis of the outlet sleeve, said inlet and outlet manifolds extending across substantially the full width of the recesses.

9. A small volume filter as defined in claim 5 further characterized by said outlet manifold being in the plate to which the outlet sleeve is connected, said manifold lying adjacent the outlet end of the body and perpendicular to the axis of the outlet sleeve.

10. A small volume filter comprising a body having inlet and outlet ends, a thin cavity in the body defined by opposed closely spaced, side surfaces and a shallow peripheral wall, the area of said side surfaces being relatively large compared to the area of the peripheral wall, a filter membrane disposed in the cavity generally parallel to the side surfaces dividing the cavity into thin inlet and outlet chambers, an inlet sleeve connected to the inlet end of the body and an outlet sleeve connected to the outlet end of the body, said sleeves extending coaxially in opposite directions and forming an acute angle with the plane of the membrane, and means including inlet and outlet manifolds respectively connecting the inlet and outlet chambers to the inlet and outlet sleeves.

11. A small volume filter as defined in claim 10 further characterized by said manifolds being substantially perpendicular to said sleeves.

12. A small volume filter as defined in claim 11 further characterized by grooves in the side surfaces of the cavity and communicating with the manifolds for conveying fluid between the manifolds and the surfaces of the filter membrane.

13. A small volume filter package comprising a flat rectangular filter body having opposite inlet and outlet ends and coaxial oppositely extending inlet and outlet sleeves respectively connected to them, means defining a flat filter cavity in the body connected to the sleeves, a filter membrane in the cavity through which fluid must pass when moving from the inlet to the outlet sleeve, a non-circular container open at one end and closed at the other housing the filter body, means supporting the filter body in the container with the outlet sleeve facing the closed end of the container and the inlet sleeve facing the open end thereof, and a removable cover on the open end of the container for enabling a syringe nipple to engage the inlet sleeve when the cover is removed and means for permitting removal of the filter body from the container when the inlet sleeve is thus engaged, and means for preserving a sterile atmosphere in the container when the cover is in place.

14. A small volume filter package as defined in claim 13 further characterized by said container being made of rigid material.

15. A small volume filter package as defined in claim 14 further characterized by said cover being made of a flexible material and sealed to the container.

16. A small volume filter package as defined in claim 14 further characterized by said container having a flat bottom wall defining the closed end so that the container may stand upright with the open end uppermost.

* * * * *